(12) United States Patent
Wylie

(10) Patent No.: US 10,198,036 B2
(45) Date of Patent: *Feb. 5, 2019

(54) DOCKING STATION FOR TABLET DEVICE

(71) Applicant: Mobile Tech, Inc., Lake Oswego, OR (US)

(72) Inventor: Hunter Wylie, Sherwood, OR (US)

(73) Assignee: MOBILE TECH, INC., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,990

(22) Filed: Jan. 19, 2018

(65) Prior Publication Data
US 2018/0143665 A1  May 24, 2018

Related U.S. Application Data

(63) Continuation of application No. 15/667,436, filed on Aug. 2, 2017, which is a continuation of application No. 14/097,171, filed on Dec. 4, 2013, now Pat. No. 9,760,116.

(60) Provisional application No. 61/733,842, filed on Dec. 5, 2012.

(51) Int. Cl.
*G06F 1/16* (2006.01)

(52) U.S. Cl.
CPC .......... *G06F 1/1632* (2013.01); *G06F 1/1654* (2013.01)

(58) Field of Classification Search
CPC .................................................. G06F 1/1632
See application file for complete search history.

(56) References Cited

U.S. PATENT DOCUMENTS

| | | | |
|---|---|---|---|
| 883,335 | A | 3/1908 | O'Connor |
| 3,444,547 | A | 5/1969 | Surek |
| 3,612,462 | A | 10/1971 | Mooney et al. |
| 3,780,909 | A | 12/1973 | Callahan et al. |
| D244,857 | S | 6/1977 | Hayes |
| 4,075,878 | A | 2/1978 | Best |
| 4,117,465 | A | 9/1978 | Timblin |
| 4,335,931 | A | 6/1982 | Kinnear |
| 4,354,613 | A | 10/1982 | Desai et al. |
| 4,384,688 | A | 5/1983 | Smith |
| 4,590,337 | A | 5/1986 | Engelmore |
| 4,714,184 | A | 12/1987 | Young et al. |
| 4,772,878 | A | 9/1988 | Kane |

(Continued)

FOREIGN PATENT DOCUMENTS

| | | |
|---|---|---|
| AT | 506665 A1 | 10/2009 |
| CA | 2465692 A1 | 11/2004 |

(Continued)

OTHER PUBLICATIONS

U.S. Appl. No. 29/604,812: Filing Receipt, dated Nov. 27, 2017, 3 pages.

(Continued)

*Primary Examiner* — Adrian S Wilson
(74) *Attorney, Agent, or Firm* — Thompson Coburn LLP

(57) ABSTRACT

A docking station for a tablet device includes a security frame that is releasably connected to a pedestal. An upper head portion of the pedestal is rotatable through three degrees of freedom to allow for angular adjustment of the frame as it retains a tablet device. Electrical conductivity is maintained through the rotational connection.

30 Claims, 7 Drawing Sheets

(56) References Cited

U.S. PATENT DOCUMENTS

| | | |
|---|---|---|
| 4,898,493 A | 2/1990 | Blankenburg |
| 5,033,709 A | 7/1991 | Yuen |
| 5,072,213 A | 12/1991 | Close |
| 5,146,205 A | 9/1992 | Keifer et al. |
| 5,176,465 A | 1/1993 | Holsted |
| 5,187,744 A | 2/1993 | Richter |
| 5,230,016 A | 7/1993 | Yasuda |
| 5,246,183 A | 9/1993 | Leyden |
| 5,436,792 A * | 7/1995 | Leman ............... F16M 11/041 16/326 |
| 5,457,745 A | 10/1995 | Wang |
| 5,459,637 A | 10/1995 | Ma et al. |
| 5,517,434 A | 5/1996 | Hanson et al. |
| 5,543,782 A | 8/1996 | Rothbaum et al. |
| 5,570,267 A | 10/1996 | Ma |
| 5,583,742 A | 12/1996 | Noda et al. |
| 5,586,002 A | 12/1996 | Notarianni |
| 5,615,258 A | 3/1997 | Ho |
| 5,685,436 A | 11/1997 | Davet |
| 5,751,548 A * | 5/1998 | Hall ............... F16C 11/10 248/122.1 |
| 5,769,369 A * | 6/1998 | Meinel ............... B60N 3/001 108/45 |
| 5,847,924 A | 12/1998 | Youn |
| 5,861,807 A | 1/1999 | Leyden et al. |
| D409,018 S | 5/1999 | Deuschle |
| 5,903,645 A | 5/1999 | Tsay |
| 5,923,528 A | 7/1999 | Lee |
| 5,982,855 A | 11/1999 | Ho |
| 6,039,496 A | 3/2000 | Bishop |
| 6,062,518 A * | 5/2000 | Etue ............... B60R 11/0241 224/542 |
| D433,953 S | 11/2000 | Woznicki et al. |
| 6,170,775 B1 | 1/2001 | Kovacik et al. |
| 6,236,435 B1 | 5/2001 | Gertz |
| D455,166 S | 4/2002 | Raad et al. |
| 6,380,855 B1 | 4/2002 | Ott |
| 6,386,906 B1 | 5/2002 | Burke |
| 6,400,560 B1 | 6/2002 | Chian |
| 6,476,717 B1 | 11/2002 | Gross et al. |
| 6,491,276 B1 | 12/2002 | Belliveau |
| 6,502,727 B1 | 1/2003 | Decoteau |
| 6,504,710 B2 | 1/2003 | Sutton et al. |
| 6,549,130 B1 | 4/2003 | Joao |
| 6,581,421 B2 | 6/2003 | Chmela et al. |
| 6,585,201 B1 * | 7/2003 | Reed ............... B60R 11/0235 248/181.1 |
| 6,644,611 B1 * | 11/2003 | Tai ............... F16C 11/10 248/292.13 |
| 6,659,382 B2 | 12/2003 | Ryczek |
| 6,700,488 B1 * | 3/2004 | Leyden ............... G08B 13/1463 340/568.1 |
| 6,702,604 B1 | 3/2004 | Moscovitch |
| 6,714,983 B1 | 3/2004 | Koenck |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,773,172 B1 | 8/2004 | Johnson et al. |
| 6,781,825 B2 | 8/2004 | Shih et al. |
| 6,786,766 B1 | 9/2004 | Chopra |
| 6,799,994 B2 | 10/2004 | Burke |
| 6,831,560 B2 | 12/2004 | Gresset |
| 6,856,506 B2 | 2/2005 | Doherty et al. |
| 6,885,817 B2 | 4/2005 | Artonne et al. |
| 6,896,543 B2 | 5/2005 | Fort et al. |
| D508,916 S | 8/2005 | Lee |
| 6,935,883 B2 | 8/2005 | Oddsen, Jr. |
| 6,944,294 B2 | 9/2005 | Tsay |
| 6,946,961 B2 | 9/2005 | Frederiksen et al. |
| 6,952,343 B2 | 10/2005 | Sato |
| 6,961,401 B1 | 11/2005 | Nally et al. |
| 7,002,467 B2 | 2/2006 | Deconinck et al. |
| 7,015,596 B2 | 3/2006 | Pail |
| 7,032,872 B2 | 4/2006 | Sullivan |
| 7,052,296 B2 * | 5/2006 | Yang ............... G06F 1/1626 439/165 |
| 7,053,774 B2 | 5/2006 | Sedon et al. |
| 7,068,496 B2 | 6/2006 | Wong et al. |
| 7,081,822 B2 | 7/2006 | Leyden et al. |
| 7,085,491 B2 | 8/2006 | Chiang |
| 7,101,187 B1 | 9/2006 | Deconinck et al. |
| 7,135,972 B2 | 11/2006 | Bonato |
| 7,154,039 B1 | 12/2006 | Marszalek et al. |
| 7,209,038 B1 | 4/2007 | Deconinck et al. |
| D545,826 S | 7/2007 | Richter |
| 7,287,652 B2 | 10/2007 | Scholen et al. |
| D563,444 S | 3/2008 | Brickzin |
| D566,590 S * | 4/2008 | Stevens ............... D10/74 |
| 7,352,567 B2 | 4/2008 | Hotelling |
| 7,385,522 B2 | 6/2008 | Belden, Jr. et al. |
| 7,387,003 B2 | 6/2008 | Marszalek et al. |
| 7,446,659 B2 | 11/2008 | Marsilio et al. |
| 7,515,408 B2 | 4/2009 | Bakker et al. |
| 7,522,047 B2 | 4/2009 | Belden et al. |
| 7,611,112 B2 | 11/2009 | Lin |
| 7,626,500 B2 | 12/2009 | Belden, Jr. et al. |
| 7,650,230 B1 | 1/2010 | Laverick et al. |
| 7,652,873 B2 | 1/2010 | Lee |
| 7,654,399 B2 | 2/2010 | Scholen et al. |
| 7,658,363 B2 | 2/2010 | Meyer |
| 7,667,601 B2 | 2/2010 | Rabinowitz et al. |
| 7,669,816 B2 | 3/2010 | Crain et al. |
| 7,684,185 B2 | 3/2010 | Farrugia |
| 7,688,205 B2 | 3/2010 | Ott |
| 7,696,857 B2 | 4/2010 | Kritt et al. |
| 7,708,240 B2 * | 5/2010 | Homer ............... G06F 1/1601 248/130 |
| 7,710,266 B2 | 5/2010 | Belden, Jr. et al. |
| 7,712,661 B2 | 5/2010 | Thomas |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,836,623 B2 * | 11/2010 | Wang ............... A47G 1/142 248/458 |
| 7,848,833 B2 | 12/2010 | Li et al. |
| 7,866,623 B2 | 1/2011 | Lampman et al. |
| 7,883,279 B2 | 2/2011 | Kendall |
| 7,909,641 B1 | 3/2011 | Henson et al. |
| D635,555 S | 4/2011 | Giles |
| D636,778 S | 4/2011 | Corsini et al. |
| D640,247 S | 6/2011 | Baumann et al. |
| 7,969,305 B2 | 6/2011 | Belden, Jr. et al. |
| D641,756 S | 7/2011 | Hsieh |
| 7,971,845 B2 | 7/2011 | Galant |
| D643,056 S | 8/2011 | Zaliauskas et al. |
| 8,007,188 B2 * | 8/2011 | Orf ............... F16M 11/041 248/177.1 |
| 8,009,348 B2 | 8/2011 | Zehner et al. |
| D645,047 S | 9/2011 | Wike |
| D649,076 S | 11/2011 | Alexander et al. |
| D650,783 S * | 12/2011 | Ausfeld ............... D13/107 |
| D650,784 S * | 12/2011 | Feldstein ............... D14/434 |
| 8,102,262 B2 | 1/2012 | Irmscher et al. |
| D661,646 S | 6/2012 | Son |
| 8,208,245 B2 | 6/2012 | Staats |
| D663,972 S | 7/2012 | Alexander et al. |
| 8,230,992 B2 * | 7/2012 | Law ............... G06F 1/1626 206/320 |
| 8,251,325 B2 | 8/2012 | Molter |
| D668,660 S | 10/2012 | Norfolk |
| 8,282,060 B2 | 10/2012 | Fan |
| 8,289,131 B2 | 10/2012 | Cho et al. |
| D670,702 S | 11/2012 | Zhang |
| D674,803 S | 1/2013 | Westrup |
| D678,287 S * | 3/2013 | Hsu ............... D14/434 |
| D678,293 S | 3/2013 | Meehan |
| D682,281 S | 5/2013 | Barnard et al. |
| 8,467,178 B2 | 6/2013 | Probst et al. |
| 8,488,832 B2 * | 7/2013 | Leung ............... G06F 1/1632 381/387 |

(56) References Cited

U.S. PATENT DOCUMENTS

| | | | |
|---|---|---|---|
| D687,440 S | 8/2013 | Shieh | |
| 8,499,384 B2 | 8/2013 | Zerhusen | |
| 8,531,829 B2 | 9/2013 | Oberpriller et al. | |
| 8,558,688 B2 | 10/2013 | Henson et al. | |
| 8,573,394 B2 | 11/2013 | Ahee et al. | |
| D696,259 S | 12/2013 | Howarth | |
| 8,611,086 B1 | 12/2013 | Magnusson et al. | |
| 8,616,508 B1* | 12/2013 | Coleman | F16M 11/10 248/176.1 |
| 8,698,617 B2 | 4/2014 | Henson et al. | |
| 8,698,618 B2 | 4/2014 | Henson et al. | |
| 8,708,151 B2* | 4/2014 | Whitten | G06F 1/1656 206/701 |
| D704,194 S | 5/2014 | Young | |
| 8,749,194 B1 | 6/2014 | Kelsch et al. | |
| 8,749,963 B2* | 6/2014 | Staats | G06F 1/1632 248/121 |
| 8,780,548 B2 | 7/2014 | Lee | |
| 8,800,763 B2 | 8/2014 | Hale | |
| 8,800,942 B2 | 8/2014 | Yu | |
| 8,807,849 B2* | 8/2014 | Apter | F16M 13/00 396/419 |
| 8,814,128 B2 | 8/2014 | Trinh et al. | |
| 8,847,759 B2 | 9/2014 | Bisesti et al. | |
| 8,851,565 B2 | 10/2014 | Hontz et al. | |
| D717,804 S | 11/2014 | Budge | |
| D718,316 S | 11/2014 | Veltz | |
| 8,885,337 B2 | 11/2014 | Schanz et al. | |
| D719,144 S | 12/2014 | Eulette | |
| 8,913,380 B2 | 12/2014 | Enomoto et al. | |
| 8,955,807 B2 | 2/2015 | Alexander et al. | |
| 8,963,498 B2 | 2/2015 | Ferguson | |
| D725,119 S | 3/2015 | Gaylord | |
| D726,732 S | 4/2015 | Lay | |
| D732,037 S | 6/2015 | Wylie et al. | |
| 9,019,698 B2 | 7/2015 | Thiers | |
| 9,092,960 B2 | 7/2015 | Wheeler et al. | |
| 9,097,380 B2 | 8/2015 | Wheeler et al. | |
| 9,158,336 B2* | 10/2015 | Brewer | A45C 11/00 |
| 9,220,358 B2 | 12/2015 | Wheeler et al. | |
| 9,229,494 B2 | 1/2016 | Rayner | |
| D748,634 S | 2/2016 | Hofer | |
| 9,269,247 B2 | 2/2016 | Fawcett et al. | |
| 9,303,809 B2 | 4/2016 | Reynolds et al. | |
| D757,731 S | 5/2016 | Nguyen | |
| 9,373,236 B2 | 6/2016 | Oehl et al. | |
| 9,396,631 B2 | 7/2016 | Fawcett et al. | |
| D766,247 S | 9/2016 | Burmester | |
| 9,478,110 B2 | 10/2016 | Fawcett et al. | |
| 9,576,452 B2 | 2/2017 | Fawcett et al. | |
| 9,641,539 B1 | 5/2017 | Votaw | |
| 9,659,472 B2 | 5/2017 | Fawcett et al. | |
| D795,263 S | 8/2017 | Fujioka | |
| D798,302 S | 9/2017 | Burmester | |
| 9,760,116 B2 | 9/2017 | Wylie | |
| 9,847,806 B1 | 12/2017 | Dickie | |
| 2001/0049222 A1 | 12/2001 | Fort et al. | |
| 2001/0055978 A1 | 12/2001 | Herrod | |
| 2002/0044406 A1 | 4/2002 | Shimoda et al. | |
| 2002/0085343 A1 | 7/2002 | Wu et al. | |
| 2002/0162366 A1 | 11/2002 | Chmela et al. | |
| 2003/0007634 A1 | 1/2003 | Wang | |
| 2003/0010859 A1 | 1/2003 | Ryczek | |
| 2003/0128975 A1 | 7/2003 | Shevick | |
| 2003/0137584 A1 | 7/2003 | Norvell et al. | |
| 2003/0222149 A1 | 12/2003 | Solomon | |
| 2003/0222848 A1 | 12/2003 | Solomon et al. | |
| 2003/0235029 A1* | 12/2003 | Doherty | G06F 1/1632 361/679.27 |
| 2004/0003150 A1 | 1/2004 | Deguchi | |
| 2004/0017652 A1 | 1/2004 | Billington et al. | |
| 2004/0113819 A1 | 6/2004 | Gauthey et al. | |
| 2004/0177658 A1* | 9/2004 | Mitchell | E05B 73/0082 70/58 |
| 2004/0201449 A1 | 10/2004 | Denison et al. | |
| 2004/0230725 A1 | 11/2004 | Chen et al. | |
| 2004/0233631 A1 | 11/2004 | Lord | |
| 2004/0257464 A1* | 12/2004 | Pandit | H04N 5/2251 348/373 |
| 2005/0014536 A1* | 1/2005 | Grady | G06F 1/1632 455/573 |
| 2005/0047104 A1 | 3/2005 | Grunow et al. | |
| 2005/0073413 A1 | 4/2005 | Sedon et al. | |
| 2005/0088572 A1 | 4/2005 | Pandit et al. | |
| 2005/0165806 A1 | 7/2005 | Roatis et al. | |
| 2005/0206522 A1 | 9/2005 | Leyden et al. | |
| 2005/0215285 A1* | 9/2005 | Lin | H04B 1/207 455/557 |
| 2005/0255895 A1 | 11/2005 | Lee et al. | |
| 2006/0061958 A1 | 3/2006 | Solomon et al. | |
| 2006/0066438 A1* | 3/2006 | Altounian | G06F 21/86 340/5.53 |
| 2006/0067036 A1 | 3/2006 | Lin et al. | |
| 2006/0148575 A1 | 7/2006 | Vitito | |
| 2007/0075914 A1 | 4/2007 | Bates | |
| 2007/0145210 A1 | 6/2007 | Fawcett et al. | |
| 2007/0152633 A1 | 7/2007 | Lee | |
| 2007/0159328 A1 | 7/2007 | Belden et al. | |
| 2007/0221726 A1 | 9/2007 | Thomas | |
| 2007/0229529 A1 | 10/2007 | Irmscher et al. | |
| 2007/0247793 A1 | 10/2007 | Carnevali | |
| 2008/0104301 A1 | 5/2008 | Assouad | |
| 2008/0168806 A1 | 7/2008 | Belden et al. | |
| 2008/0169923 A1 | 7/2008 | Belden et al. | |
| 2008/0222849 A1 | 9/2008 | Lavoie | |
| 2008/0288702 A1 | 11/2008 | Diab | |
| 2009/0007390 A1 | 1/2009 | Tsang et al. | |
| 2009/0009936 A1* | 1/2009 | Neu | H04B 1/3877 361/679.01 |
| 2009/0033492 A1 | 2/2009 | Rapp et al. | |
| 2009/0034221 A1 | 2/2009 | Kerrigan | |
| 2009/0059481 A1* | 3/2009 | Taylor | H04B 1/3816 361/679.01 |
| 2009/0079566 A1 | 3/2009 | Goldstein et al. | |
| 2009/0080684 A1 | 3/2009 | Groset | |
| 2009/0114556 A1 | 5/2009 | Tai et al. | |
| 2009/0166483 A1 | 7/2009 | Marsilio et al. | |
| 2009/0173868 A1 | 7/2009 | Fawcett et al. | |
| 2009/0179127 A1 | 7/2009 | Pettey | |
| 2009/0183266 A1 | 7/2009 | Tan et al. | |
| 2009/0186583 A1* | 7/2009 | Seil | H04B 1/3877 455/66.1 |
| 2009/0225166 A1 | 9/2009 | Dronge | |
| 2009/0303692 A1 | 12/2009 | Terlizzi | |
| 2009/0328141 A1 | 12/2009 | Zhang | |
| 2010/0012809 A1* | 1/2010 | Zeng | F16M 11/10 248/351 |
| 2010/0075609 A1* | 3/2010 | Seil | B60R 11/02 455/66.1 |
| 2010/0078343 A1* | 4/2010 | Hoellwarth | B29C 45/14639 206/320 |
| 2010/0081337 A1 | 4/2010 | Dorogusker et al. | |
| 2010/0124040 A1* | 5/2010 | Diebel | G06F 1/1628 361/816 |
| 2010/0138581 A1 | 6/2010 | Bird et al. | |
| 2010/0172081 A1 | 7/2010 | Tian et al. | |
| 2010/0195279 A1 | 8/2010 | Michael | |
| 2010/0215355 A1 | 8/2010 | Olien | |
| 2010/0326934 A1 | 12/2010 | Goldberg | |
| 2011/0047844 A1 | 3/2011 | Fawcett et al. | |
| 2011/0068919 A1 | 3/2011 | Rapp et al. | |
| 2011/0187531 A1 | 8/2011 | Oehl et al. | |
| 2011/0195786 A1 | 8/2011 | Wells | |
| 2011/0254661 A1 | 10/2011 | Fawcett et al. | |
| 2011/0278885 A1 | 11/2011 | Procter | |
| 2011/0283754 A1 | 11/2011 | Ezzo et al. | |
| 2011/0303816 A1 | 12/2011 | Horvath et al. | |
| 2011/0309934 A1 | 12/2011 | Henson et al. | |
| 2012/0026119 A1 | 2/2012 | Judy | |
| 2012/0033375 A1 | 2/2012 | Madonna et al. | |
| 2012/0037783 A1 | 2/2012 | Alexander et al. | |
| 2012/0043247 A1 | 2/2012 | Westrup | |

(56) References Cited

U.S. PATENT DOCUMENTS

| | | | |
|---|---|---|---|
| 2012/0043451 A1 | 2/2012 | Alexander et al. | |
| 2012/0155004 A1 | 6/2012 | Yukawa et al. | |
| 2012/0175474 A1 | 7/2012 | Barnard et al. | |
| 2012/0182680 A1 | 7/2012 | Wetzel | |
| 2012/0188689 A1* | 7/2012 | Leung | G06F 1/1632 361/679.01 |
| 2012/0189156 A1 | 7/2012 | Leung | |
| 2012/0193496 A1 | 8/2012 | Li | |
| 2012/0205326 A1 | 8/2012 | Richter et al. | |
| 2012/0217371 A1 | 8/2012 | Abdollahzadeh et al. | |
| 2012/0234055 A1 | 9/2012 | Bland, III et al. | |
| 2012/0280810 A1 | 11/2012 | Wheeler | |
| 2012/0286118 A1 | 11/2012 | Richards | |
| 2012/0293924 A1 | 11/2012 | Dolci et al. | |
| 2012/0303476 A1 | 11/2012 | Krzyzanowski et al. | |
| 2013/0026322 A1 | 1/2013 | Wheeler | |
| 2013/0026332 A1 | 1/2013 | Wheeler et al. | |
| 2013/0043369 A1 | 2/2013 | Wheeler | |
| 2013/0058023 A1 | 3/2013 | Supran | |
| 2013/0107126 A1 | 5/2013 | Nonomura et al. | |
| 2013/0107449 A1 | 5/2013 | Su et al. | |
| 2013/0161054 A1 | 6/2013 | Allison et al. | |
| 2013/0168527 A1 | 7/2013 | Wheeler et al. | |
| 2013/0238516 A1 | 9/2013 | Moock et al. | |
| 2013/0268316 A1 | 10/2013 | Moock et al. | |
| 2013/0346661 A1 | 12/2013 | Hasenei | |
| 2014/0118930 A1* | 5/2014 | Sedon | E05B 73/0082 361/679.56 |
| 2014/0159898 A1 | 6/2014 | Wheeler et al. | |
| 2014/0168884 A1 | 6/2014 | Wylie | |
| 2014/0058023 A1 | 9/2014 | Khodapanah | |
| 2014/0321048 A1 | 10/2014 | Kupferstein | |
| 2014/0328020 A1 | 11/2014 | Galant | |
| 2014/0355200 A1 | 12/2014 | Thiers | |
| 2014/0380442 A1 | 12/2014 | Addepalli | |
| 2015/0048625 A1 | 6/2015 | Weusten et al. | |
| 2015/0156900 A1 | 6/2015 | Yeh | |
| 2015/0186685 A1 | 7/2015 | Vroom | |
| 2015/0201723 A1* | 7/2015 | Rayner | G06F 1/1601 224/191 |
| 2015/0212590 A1* | 7/2015 | Feldstein | G06F 1/1656 345/173 |
| 2016/0042620 A1 | 2/2016 | Dandie et al. | |
| 2016/0135560 A1 | 5/2016 | Yeh | |
| 2016/0239796 A1 | 8/2016 | Grant et al. | |
| 2017/0032636 A1 | 2/2017 | Henson et al. | |
| 2017/0193780 A1 | 7/2017 | Moock et al. | |
| 2018/0017992 A1 | 1/2018 | Wylie | |
| 2018/0032104 A1 | 2/2018 | Schatz et al. | |
| 2018/0143664 A1 | 5/2018 | Wylie | |

FOREIGN PATENT DOCUMENTS

| | | |
|---|---|---|
| CA | 2802845 A1 | 5/2011 |
| CN | 103098104 A | 5/2011 |
| DE | 20 2009 013722 U1 | 1/2011 |
| EP | 0745747 A1 | 12/1996 |
| EP | 1575249 A2 | 9/2005 |
| EP | 2619737 | 5/2011 |
| ES | 1058183 U | 11/2004 |
| FR | 2595227 A1 | 9/1987 |
| FR | 2768906 A1 | 4/1999 |
| FR | 2868459 | 10/2005 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| JP | 2013529141 | 5/2011 |
| TW | 103115313 A | 4/2014 |
| WO | 1997031347 A1 | 8/1997 |
| WO | 2004/038670 A1 | 5/2004 |
| WO | 2012039794 | 3/2012 |
| WO | 2012151130 | 4/2012 |
| WO | 2013015855 | 4/2012 |
| WO | 2012069816 A1 | 5/2012 |
| WO | 2012151130 A1 | 11/2012 |
| WO | 2013068036 A1 | 5/2013 |
| WO | 2013134484 A1 | 9/2013 |
| WO | 2014019072 A1 | 2/2014 |
| WO | 2014107184 A1 | 7/2014 |
| WO | 2014134718 A1 | 9/2014 |
| WO | 2015050710 A1 | 4/2015 |
| WO | 2015051840 A1 | 4/2015 |
| WO | 2015/184993 A1 | 12/2015 |

OTHER PUBLICATIONS

U.S. Appl. No. 29/604,812: Requirement for Restriction/Election, dated Mar. 19, 2018, 7 pages.
PCT/US17/44230: Initial Publication with ISR, dated Feb. 1, 2018, 46 pages.
PCT/US17/44230: Written Opinion of the International Search Authority, dated Feb. 1, 2018, 7 pages.
"35 mm Camera Display"—Walmart Publication 1995, 5 pages.
Excerpt from Bruce Schneier, Applied Cryptology: Protocols, Algorithms, and Source Code in C (1994), 14 pages.
International Search Report for PCT/US2011/037235 dated Oct. 21, 2011.
Retailgeek, "Virtual Tour of MTI Retail Innovation Center in 2009," YouTube Video https://www.youtube.com/watch?v=-wUvcDAmhj0, published on Aug. 2, 2010 (see transcript and sample screenshots, pp. 1-20).
Propelinteractive, "Installing LP3 Old Version", YouTube Video https://wvvw.youtube.com/watch?v=FRUaOFWiDRw&t=1s, published on Jun. 28, 2010 (see sample screenshots, pp. 1-9).
Propelinteractive, "Freedom Universal 2 Animation_003.wmv", YouTube Video https://www.youtube.com/watch?v=_odGNnQv0BQ&t=1s, published on Feb. 16, 2010 (see sample screenshots, pp. 1-24).
Propelinteractive, "MTI LP3 Product Mounting", YouTube Video https://www.youtube.com/watch?v=KX4TEuj1jCl, published on Jun. 23, 2010 (see sample screenshots, pp. 1-11).
Unicam Europe, "Freedom Lp3 4.17.09", SlideShare Presentation https://www.slideshare.net/Borfu/freedom-lp3-41709, published on Jul. 28, 2009 (pp. 1-9).
"Declaration of Mike Cook", *Vanguard Products Group, Inc. v. Merchandising Technologies, Inc.*, Case No. 3:10-cv-392-BR, U.S. District Court for the District of Oregon, Oct. 20, 2010, pp. 1-7.
MTI 2008 PowerPoint, "Vanguard Program" (Exhibit 1005 of Declaration of Mike Cook), pp. 1-9.
"Declaration of Thaine Allison in Support of Patent Owner's Reply to Petitioner's Opposition to Patent Owner's Motion to Amend", Inter Partes Review of U.S. Pat. No. 7,909,641, Case IPR2013-00122, Feb. 5, 2014, pp. 1-13.
"Deposition of Thaine Allison, III", Inter Partes Review of U.S. Pat. No. 7,909,641, Case IPR2013-00122, Feb. 24, 2014, pp. 1-198.
Reuters, "MTI Begins Shipping Freedom™ Universal 2.0 Merchandising Solution", Oct. 1, 2008, pp. 1-3.
"MTI Freedom Universal 2.0 Product Manual", Dec. 2008, pp. 1-21.
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
"Reasons for Substantial New Question of Patentability and Supplemental Examination Certificate", Inter Partes Review of U.S. Pat. No. 7,909,641, Case IPR2013-00122, Jan. 30, 2013, pp. 1-12.
U.S. Appl. No. 61/607,802, filed Mar. 7, 2012.
U.S. Appl. No. 61/620,621, filed Apr. 5, 2012.
U.S. Appl. No. 61/884,098, filed Sep. 29, 2013.
U.S. Appl. No. 61/774,870, filed Mar. 8, 2013.
U.S. Appl. No. 14/845,146: prosecution history.
U.S. Appl. No. 29/415,938: prosecution history.
U.S. Appl. No. 29/605,793: app as filed.
U.S. Appl. No. 29/605, 791: app as filed.

(56) References Cited

OTHER PUBLICATIONS

U.S. Appl. No. 29/605,580: app as filed.
U.S. Appl. No. 29/605,581: app as filed.
U.S. Appl. No. 29/605,583: app as filed.
U.S. Appl. No. 29/605,579: app as filed.
U.S. Appl. No. 15/488,370: app as filed.
U.S. Appl. No. 15/488,379: app as filed.
U.S. Appl. No. 15/488,373: app as filed.
U.S. Appl. No. 15/488,383: app as filed.
16206866.2: app as filed.
U.S. Appl. No. 12/351,837: app as filed.
U.S. Appl. No. 62/323,466: app as filed.
U.S. Appl. No. 62/323,511: app as filed.
PCT/US2017/027798: app as filed.
PCT/US2017/027801: app as filed.
U.S. Appl. No. 29/604,812, filed May 19, 2017, 29 pages.
U.S. Appl. No. 29/604,812: Filing Receipt, dated May 23, 2017, 3 pages.
U.S. Appl. No. 15/367,028, filed Dec. 1, 2016, 113 pages.
U.S. Appl. No. 15/367,028: Filing Receipt, dated Dec. 13, 2016, 3 pages.
U.S. Appl. No. 15/367,028: Notice to File Missing Parts, dated Dec. 13, 2016, 3 pages.
U.S. Appl. No. 15/367,028: Request for Corrected Filing Receipt, dated Dec. 22, 2016, 7 pages.
U.S. Appl. No. 15/367,028: Filing Receipt, dated Dec. 28, 2016, 3 pages.
U.S. Appl. No. 15/367,028: Applicant Response to Pre-Exam Formalities Notice, dated Feb. 13, 2017, 12 pages.
U.S. Appl. No. 15/367,028: Filing Receipt, dated Feb. 28, 2017, 3 pages.
U.S. Appl. No. 15/367,028: Notice of Publication, dated Jun. 8, 2017, 1 page.
U.S. Appl. No. 15/367,028: Non-Final Rejection, dated Oct. 30, 2017, 12 pages.
U.S. Appl. No. 15/367,028: Application Data Sheet to update/correct info, dated Nov. 21, 2017, 7 pages.
U.S. Appl. No. 15/367,028: Filing Receipt, dated Nov. 22, 2017, 3 pages.
U.S. Appl. No. 15/367,028: Amendment/Req. Reconsideration-After Non-Final Reject, dated Jan. 30, 2018, 14 pages.
U.S. Appl. No. 15/656,520: Application as filed and Preliminary Amendment, dated Jul. 21, 2017, 120 pages.
U.S. Appl. No. 15/656,520: Filing Receipt, dated Jul. 28, 2017, 3 pages.
U.S. Appl. No. 15/656,520: Applicant Response to Pre-Exam Formalities, dated Sep. 25, 2017, 9 pages.
U.S. Appl. No. 15/656,520: Filing Receipt, dated Sep. 26, 2017, 3 pages.
U.S. Appl. No. 15/656,520: Non-Final Rejection, dated Nov. 27, 2017, 11 pages.
U.S. Appl. No. 15/656,520: Notice of Publication, dated Jan. 4, 2018, 1 page.
PCT/US16/64863 / WO2017/096330: Initial Publication without ISR, dated Jun. 8, 2017.
PCT/US16/64863 / WO2017/096330: International Search Report, dated Oct. 20, 2017, 5 pages.
U.S. Appl. No. 14/097,171, filed Dec. 4, 2013, 23 pages.
U.S. Appl. No. 14/097,171: Filing Receipt, dated Dec. 23, 2013, 3 pages.
U.S. Appl. No. 14/097,171: Notice to File Missing Parts, dated Dec. 23, 2013, 2 pages.
U.S. Appl. No. 14/097,171: Applicant Response to Pre-Exam Formalities Notice, dated Feb. 24, 2014, 9 pages.
U.S. Appl. No. 14/097,171: Filing Receipt, dated Mar. 11, 2014, 3 pages.
U.S. Appl. No. 14/097,171: Notice of Publication, dated Jun. 19, 2014, 1 page.
U.S. Appl. No. 14/097,171: Non-Final Rejection, dated Jan. 2, 2015, 6 pages.
U.S. Appl. No. 14/097,171: Amendment/Req. Reconsideration-After Non-Final Reject, dated Jul. 1, 2015, 7 pages.
U.S. Appl. No. 14/097,171: Final Rejection, dated Sep. 17, 2015, 9 pages.
U.S. Appl. No. 14/097,171: RCE and Amendments, dated Feb. 17, 2016, 11 pages.
U.S. Appl. No. 14/097,171: Non-Final Rejection, dated Mar. 17, 2016, 10 pages.
U.S. Appl. No. 14/097,171: Amendment/Req. Reconsideration-After Non-Final Reject, dated Aug. 17, 2016, 7 pages.
U.S. Appl. No. 14/097,171: Final Rejection, dated Nov. 10, 2016, 14 pages.
U.S. Appl. No. 14/097,171: RCE and Amendments, dated Apr. 10, 2017, 18 pages.
U.S. Appl. No. 14/097,171: Notice of Allowance and Fees Due, dated May 2, 2017, 11 pages.
U.S. Appl. No. 14/097,171: Issue Fee Payment, dated Aug. 2, 2017, 1 page.
U.S. Appl. No. 14/097,171: Filing Receipt, dated Aug. 2, 2017, 3 pages.
U.S. Appl. No. 14/097,171: Issue Notification, dated Aug. 23, 2017, 1 page.
U.S. Appl. No. 15/667,436, filed Aug. 2, 2017, 25 pages.
U.S. Appl. No. 15/667,436: Notice to File Missing Parts, dated Aug. 10, 2017, 2 pages.
U.S. Appl. No. 15/667,436: Filing Receipt, dated Aug. 10, 2017, 3 pages.
U.S. Appl. No. 15/667,436: Applicant Response to Pre-Exam Formalities Notice, dated Oct. 5, 2017, 11 pages.
U.S. Appl. No. 15/667,436: Notice of Publication, dated Jan. 18, 2018, 1 page.
U.S. Appl. No. 15/667,436: Non-Final Rejection, dated Feb. 22, 2018, 9 pages.
U.S. Appl. No. 15/875,957: Application as filed, dated Jan. 19, 2018, 30 pages.
U.S. Appl. No. 15/875,957: Filing Receipt, dated Feb. 15, 2018, 3 pages.
U.S. Appl. No. 15/875,957: Office of Petitions Decision, dated Feb. 21, 2018, 2 pages.
U.S. Appl. No. 15/659,556, filed Jul. 25, 2017, 62 pages.
U.S. Appl. No. 15/659,556: Filing Receipt, dated Aug. 2, 2017, 3 pages.
U.S. Appl. No. 15/659,556: Non-Final Rejection, dated Jan. 24, 2018, 22 pages.
U.S. Appl. No. 15/659,556: Notice of Publication, dated Feb. 1, 2018, 1 page.
U.S. Appl. No. 15/600,642: Application as filed, dated May 19, 2017, 30 pages.
U.S. Appl. No. 15/600,642: Filing Receipt, dated May 31, 2017, 3 pages.
Office Action for U.S. Appl. No. 15/667,436 dated Feb. 22, 2018.

\* cited by examiner

DOCKING STATION FOR TABLET DEVICE

CROSS REFERENCE TO RELATED APPLICATIONS

This application is a continuation of and claims priority under 35 USC 120 to U.S. patent application Ser. No. 15/667,436, filed Aug. 2, 2017, entitled "DOCKING STATION FOR TABLET DEVICE," which is a continuation of U.S. patent application Ser. No. 14/097,171, filed Dec. 4, 2013, now U.S. Pat. No. 9,760,116, entitled "DOCKING STATION FOR TABLET DEVICE," which claims priority under 35 USC 119 to U.S. Provisional Application Ser. No. 61/733,842, filed Dec. 5, 2012, and entitled, "DOCKING STATION FOR TABLET DEVICE," the entire content of each of which is incorporated herein by reference; this application is related to U.S. patent application Ser. No. 15/875,957, filed Jan. 19, 2018, entitled "DOCKING STATION FOR TABLET DEVICE."

TECHNICAL FIELD

The design disclosed below relates to a docking station for a tablet device. More particularly, the design relates to a docking station that allows the tablet device to be used as a work station, or alternatively, the tablet device can be undocked and used remotely from the work station position.

BACKGROUND OF THE INVENTION

In general terms, electronic tablet devices (or "tablets") have evolved such that they are now performing many of the functions that were formerly performed by laptop or desktop computers. The processing capability of tablets now allow them to perform standard business functions.

Because of their size and portability, one of the problems associated with the use of tablets in a business setting relates to physical security and/or theft of the device itself. The design disclosed here addresses these problems.

SUMMARY OF THE INVENTION

The following is a summary of the various improvements disclosed in this document.

The disclosed design is a docking station that is primarily intended to be used in connection with tablet devices. Tablet devices are well-known electronic devices. They are sometimes called electronic tablets, tablet computers, or just "tablets."

The docking station disclosed here includes a security frame portion for retaining the tablet. The security frame portion surrounds the tablet and provides a framework for carrying the tablet from place-to-place while retained within the security frame.

The frame portion carries or has a first universal adapter that electrically couples the tablet to the frame portion. The universal adapter is designed so that it may electrically couple to the different kinds of connection ports that relate to different brands of tablets. As a person skilled in the art would know, these connection ports provide a means for transmitting power and data to and from the tablet.

The docking station also includes a pedestal, or pedestal portion, that normally rests on a workstation surface or the like. The pedestal has a connecting head portion that provides a means for releasably connecting the above-described frame portion to the pedestal portion. The head portion carries a second universal adapter for electrically coupling the head portion to the first universal adapter on the frame portion, previously described, when the frame portion is connected or "docked" to the pedestal portion.

Another feature of the design involves a rotational connection between the head portion of the pedestal and a lower base portion of the pedestal. The rotational connection enables three degrees of angular orientation or adjustment of the head portion relative to the base portion. This, in turn, allows for adjustment of the view angle of the tablet when it is docked.

The base portion is connectable to or provides electrical connection ports for at least one electrical signal, although preferably, it includes ports for numerous kinds of electrical connections that normally involve power and data. A conductor pathway is provided through the base member to the universal adapter carried by the head portion by crossing the rotational connection between the head portion and the base portion. This allows electrical connectivity to be maintained regardless of the angular portion of the frame (and tablet) relative to the pedestal.

Another feature of the design involves locking the frame to the pedestal. While this may be accomplished in different ways, the design disclosed here includes an electronic lock for additional security The foregoing summary will become better understood upon review of the attached drawings which are to be taken in conjunction with the written description set forth below.

BRIEF DESCRIPTION OF THE DRAWINGS

In the drawings, like reference numerals and letters refer to like parts throughout the various views, and wherein.

DETAILED DESCRIPTION

Figure 1:
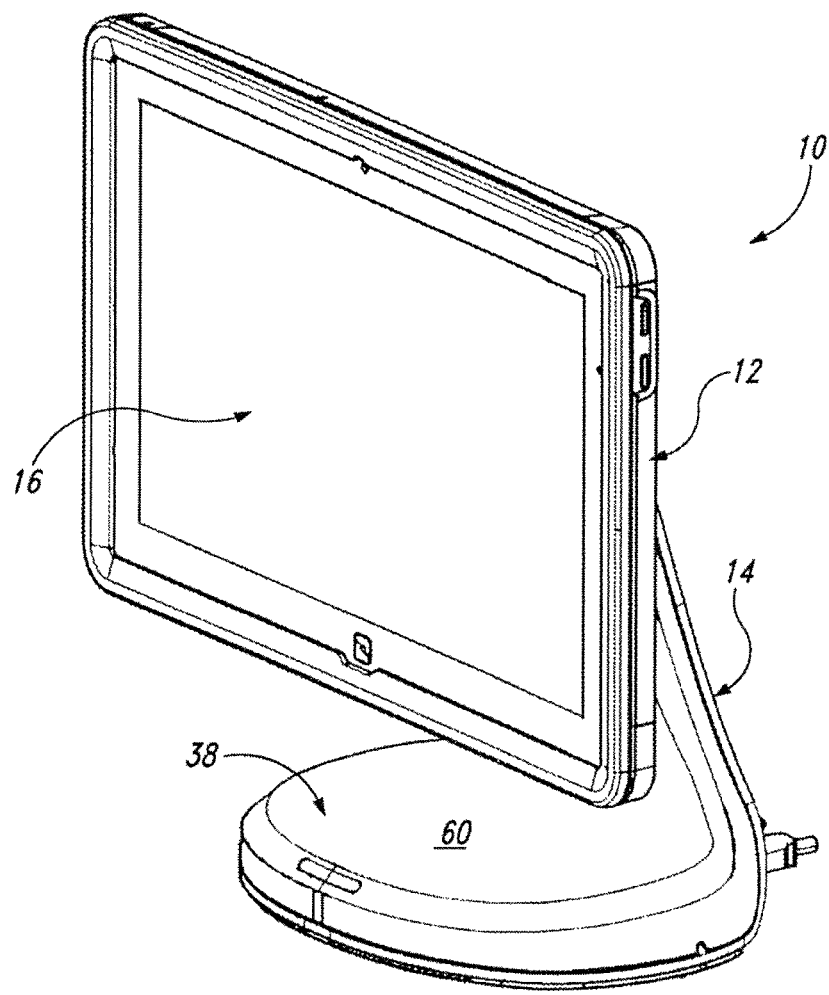
FIG. 1 is a perspective view of a docking station constructed in accordance with the patent claims.
Figure 2:
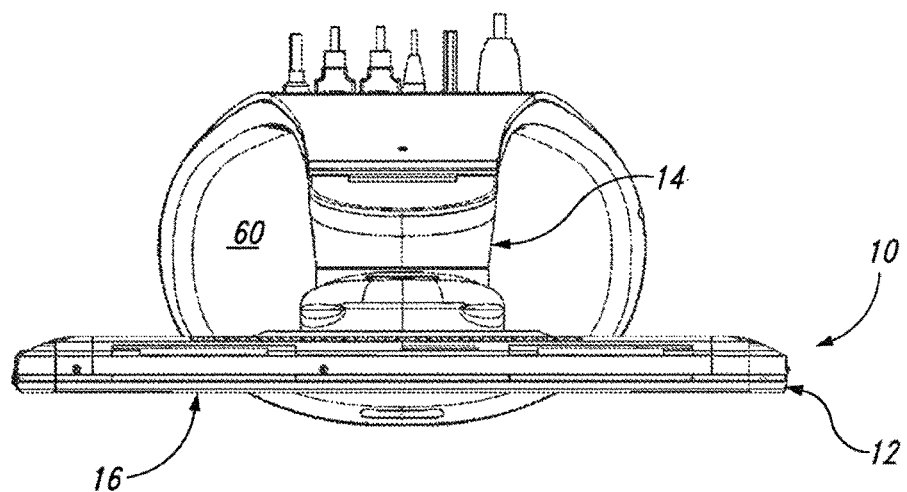
FIG. 2 is a top view of the docking station.
Figure 3:
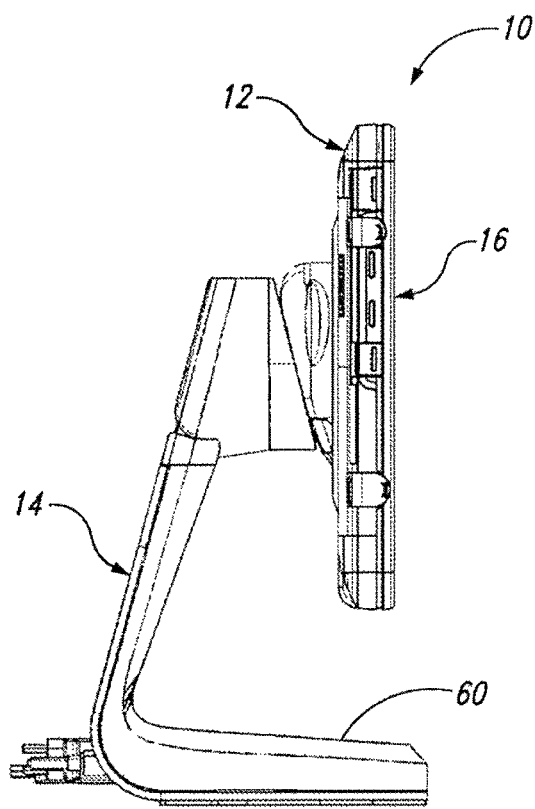
FIG. 3 is a side view of the docking station.

Referring now to the drawings, and first to FIG. 1, indicated generally at 10 is a docking station in accordance with the present disclosure. The docking station 10 includes a security frame portion, indicated generally at 12, and a pedestal portion, indicated generally at 14.

The pedestal portion 14 surrounds and captures a tablet device 16. The outline of the tablet's screen is indicated by dashed line 18 in FIG. 1. The activating button on the tablet is indicated at 20.

Although the frame 12 is illustrated here as surrounding and capturing the tablet 16, it is to be understood that there could be other physical embodiments that perform the same function without completely surrounding the entire or full periphery of the tablet 16.

Figure 4:
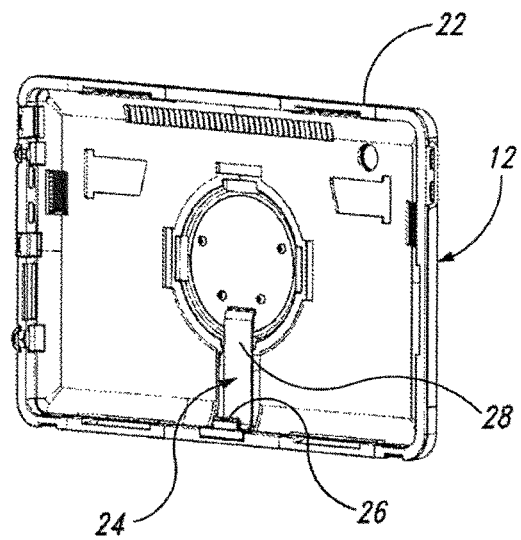
FIG. 4 is a perspective view of a security frame portion of the docking station that holds or retains a tablet.

Referring now to FIGS. 4-7, further details of the frame portion 12 will now be described. FIG. 4 illustrates the frame portion 12 without the tablet inside (looking at the front). As can be seen from the Fig., it has a rectangular peripheral edge 22 that captures the edge of the tablet 16. Depending on the configuration, the edge structure 22 may be provided with built-in openings for different kinds of tablet access ports (for the purpose of pushing buttons on the tablet or accessing jacks, etc.).

Figure 6:
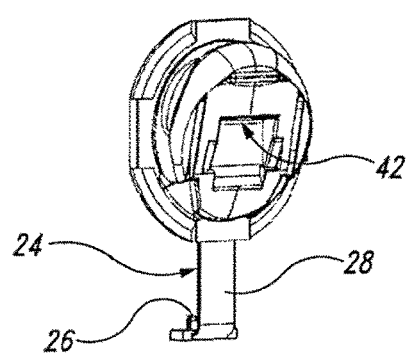
FIG. 6 is a perspective view of an adapter portion of the security frame illustrated in FIG. 4.
Figure 7:
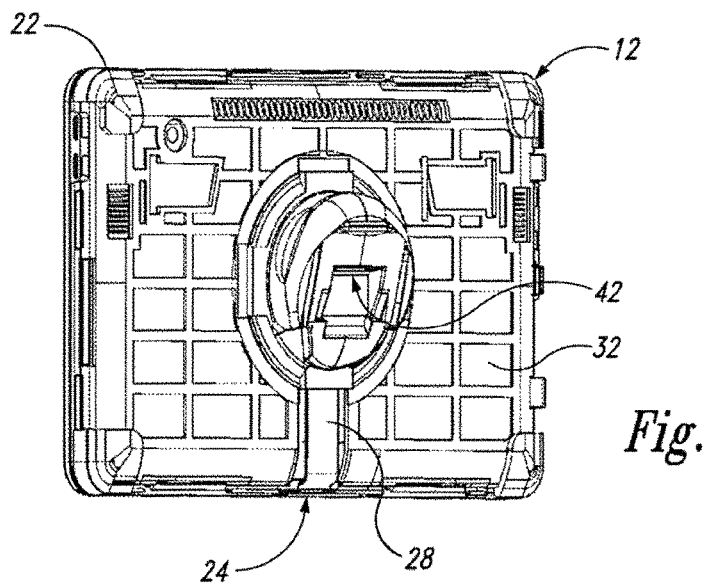
FIG. 7 is a perspective view of the back-side of the security frame portion illustrated in FIG. 4.

The frame 12 carries a first electrical adapter, indicated generally at 24 in FIGS. 4 and 6, that provides the needed electrical connection to the tablet 16. The adapter 24 is "universal" in that it has a universal connector fitting 26 that would be shaped to fit a variety of different kinds of tablets (tablet variations are dictated by brand). Typically, and as a person skilled in the art would understand, the universal adapter 24 provides power and data connections for the tablet—i.e., power for the device's battery, etc., and data for network or Internet connections, if hard-wired connections are desired. The conductors for the universal adapter 24 run through a stem portion 28 (see FIG. 6 of the universal adapter 24).

Figure 5:
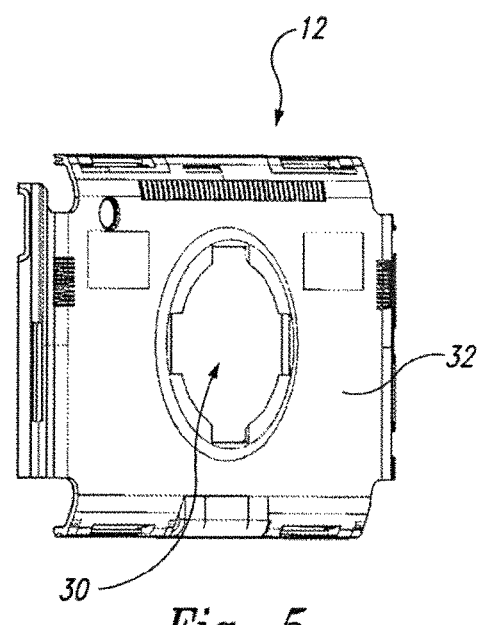
FIG. 5 is a perspective view of a back-side part of the security frame portion illustrated in FIG. 4.

FIG. 5 illustrates the back-side or back plate 30 of the frame portion 12. It is surrounded by the edge 22 previously described. As is shown in FIG. 5, it has an opening 30 for capturing the universal adapter 24 previously described. When all of these components are assembled together, it produces the frame portion of the docking station indicated in FIG. 4 (the front side) and FIG. 7 (the back side).

Figure 8:
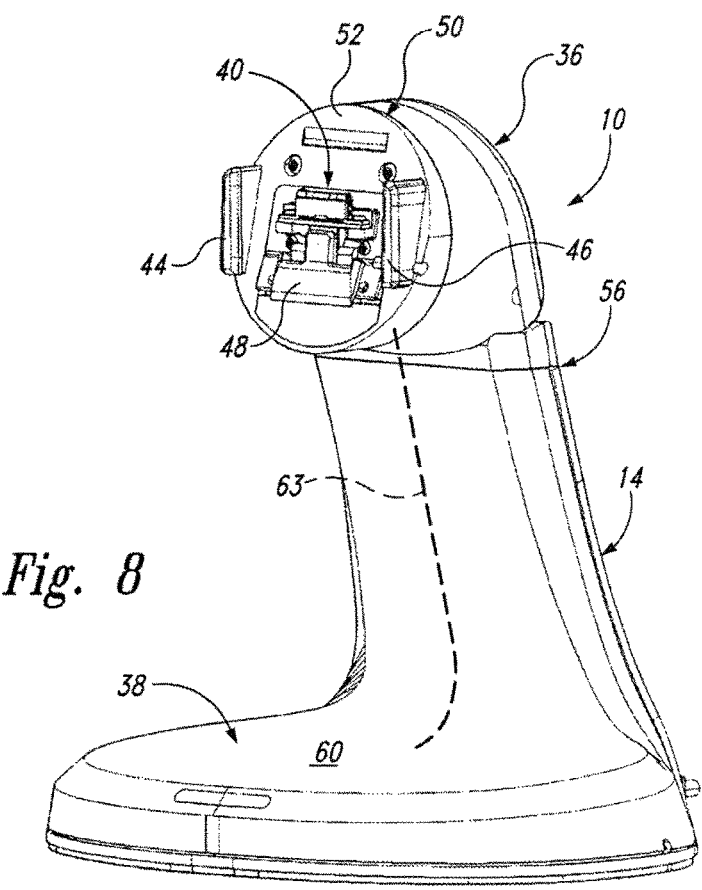
FIG. 8 is a perspective view of a pedestal portion of the docking station illustrated in FIG. 1.

Referring now to FIG. 8, reference numeral 14 generally indicates the pedestal portion of the docking station 10. The pedestal portion includes an upper head portion, indicated generally at 36, and a lower base portion, indicated generally at 38. The head portion 36 carries a second universal adapter 40 that connects into a similar connector fitting in a recess of 42 of the first adapter 24.

The first adapter 24 releasably rests on protrusions 44, 46 on head portion 36. It has a conventional catch 48 that allows adapter 24 (and therefore, frame 12) to be releasably connected to and from the pedestal portion 14 (via the head 36).

An advantage to the design is that the portion fitting 40 adjacent the front face 52 of head portion 36 creates a reliable interface connection point for engagement/disengagement of the first universal adapter 24 (and frame portion 12) with the pedestal portion 14.

Figure 9:
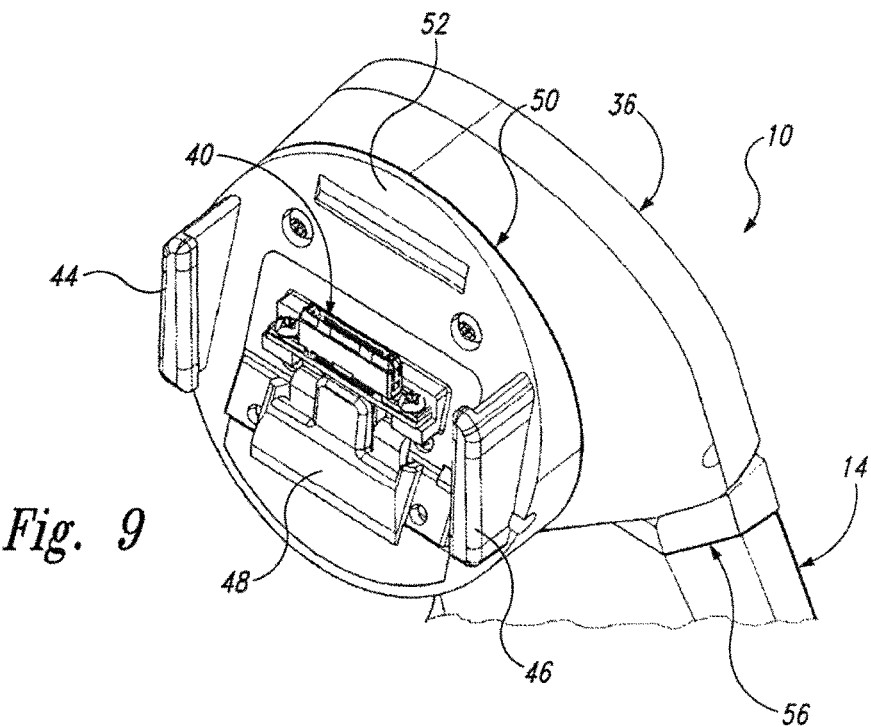
FIG. 9 is an enlarged view of the head of the pedestal portion illustrated in FIG. 8.

The head portion 36 is designed to rotate at three physical positions. The first position is indicated by arrow 50 in FIG. 9, which illustrates a circular rotation of the front face 52 of the head portion about an axis that would project normally out from face 52. When the frame portion 12 is mounted to the pedestal 14, this arrangement provides one degree of freedom of rotation that would allow the tablet 16 to be rotated between portrait and landscape orientations, if desired. Arrow 54 in FIG. 10 points to another area designed to allow the head 36 to rotate up or down to rotationally lift or lower the screen of the tablet for vertical positioning, as desired.

Finally, arrow 56 points to a last position for angularly rotating the head about a vertical or upright axis for angularly adjusting the tablet screen 16 from left-to-right, as desired.

Figure 12:
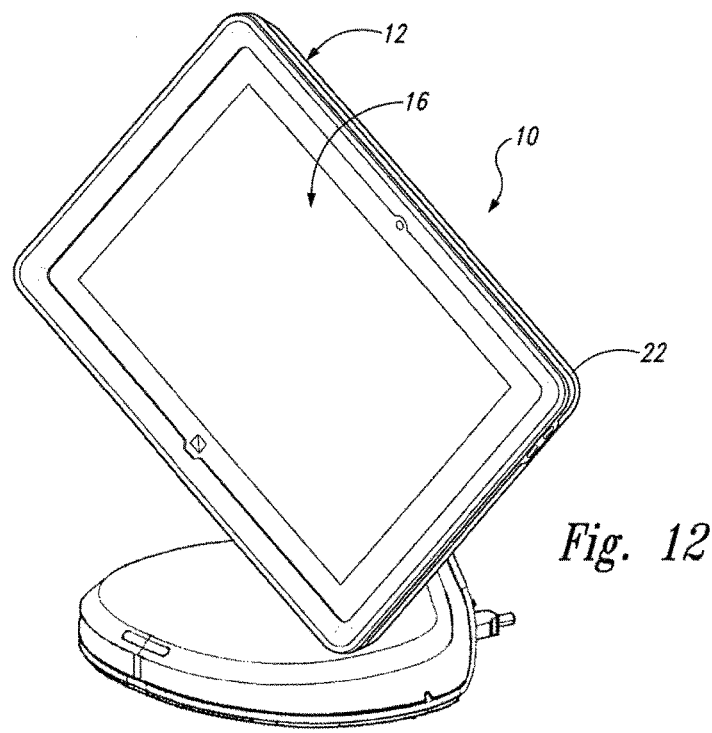
FIG. 12 is a perspective view of the docking station, showing angular rotation of the tablet device.
Figure 13:
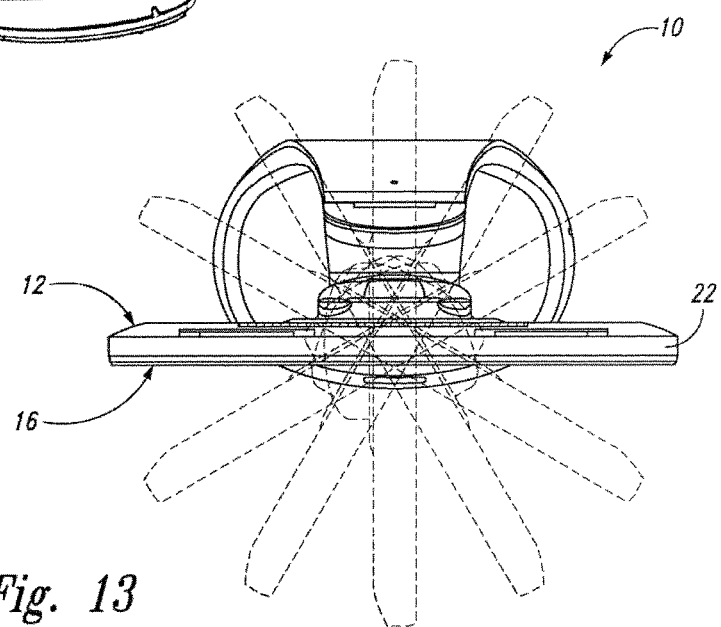
FIG. 13 is a top view of FIG. 12 and shows different rotational positions of the tablet device.

The physical structure of the above rotational connections can take different forms, using different types of pins or moldings that allow one part to rotate relative to another. In all cases, what is important about the design is that it allows three degrees of rotation without interfering with the wiring in the pedestal portion. FIGS. 12 and 13 illustrate different possible rotational positions.

Figure 11:
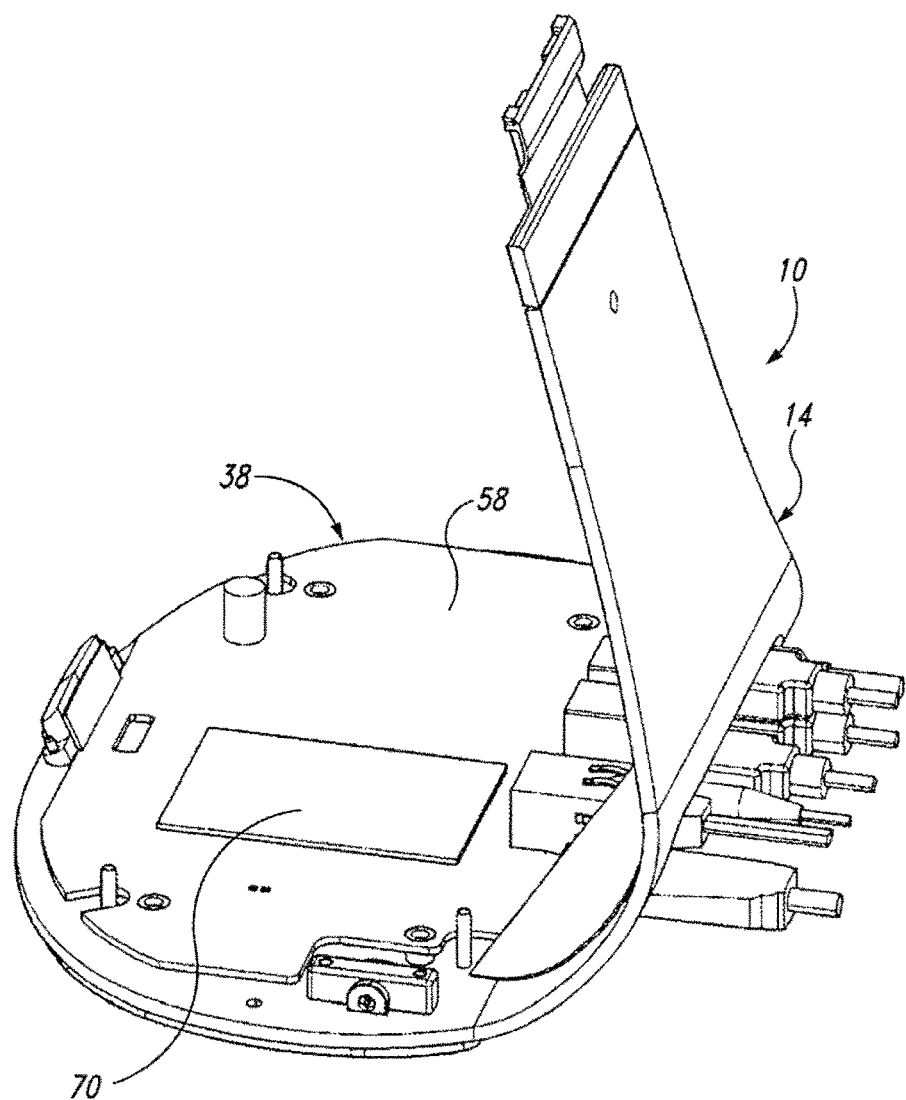
FIG. 11 is a view of the lower portion of the pedestal portion illustrated in FIG. 8, with a cover removed to reveal an electronics board.

In this last respect, FIG. 11 illustrates base portion 38 with its cover plate 60 removed, thus exposing an electronics control board (ECB) 58 inside the base portion. A series of electrical connector fittings (USB, etc.) are electrically connected to the ECB 58 for providing data or power. These electrical signals are passed, via wiring, or a wiring harness, up through the body of the pedestal 14, which is hollow. The position of the wiring is schematically indicated by dashed line 63 in FIG. 8.

Figure 10:
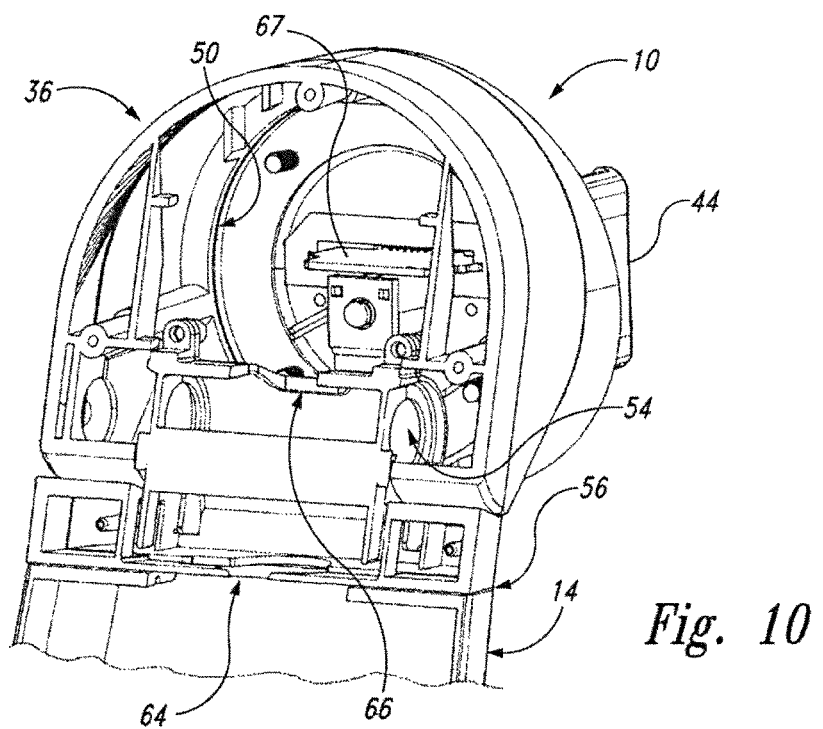
FIG. 10 is a view like FIG. 9, but is taken from the back-side perspective of the pedestal portion.

Referring to FIG. 10, the pedestal 14 has openings 64, 66 that enable the wiring to pass through the head space, and through the physical zone of rotational connections described above. This allows rotation without stressing the wiring. The wiring connects to a board 67 upon which the second adapter fitting 40 rests. The board 67 provides the wiring connections to the fitting 40.

Finally, the frame portion 12 could be releasably locked to the pedestal portion via a RFID lock if desired. The ECB 58 in the base portion has surface space for a RFID sensor 70 that could detect a wireless keycard, if desired. The sensor would activate locks on the head portion, upon detection of the keycard.

It is to be appreciated that the foregoing description sets forth the best known examples and embodiments. It is not intended that any of the foregoing description be used to limit the scope of the patent protection. Instead, all patent protection is to be defined solely by the patent claim or claims that follow this description, the interpretation of which is to be made according to the legal rules of patent claim interpretation and the rules and regulations of the U.S. Patent and Trademark Office.

What is claimed is:

1. A docking station for a tablet device, the docking station comprising:
   a frame assembly for retaining the tablet device, the frame assembly including a frame adapter and a first electrical connection, the frame adapter being electrically connectable to the tablet device via the first electrical connection;
   a pedestal assembly including a head portion and a base portion, the head portion being connected to the base portion, the head portion including a pedestal adapter and a second electrical connection, the pedestal adapter being electrically connectable to a power source via the second electrical connection, the pedestal adapter being releasably connectable to the frame adapter;
   the pedestal adapter and the frame adapter being configured such that the pedestal assembly and the frame assembly are electrically connected whenever the pedestal adapter is connected to the frame adapter, the pedestal adapter and the frame adapter being configured such that the pedestal assembly is electrically unconnected to the frame assembly whenever the pedestal adapter is not connected to the frame adapter;
   the frame assembly being positionable relative to the base portion of the pedestal assembly in a landscape orientation and in a rotated orientation, the rotated orientation being different from the landscape orientation, the pedestal assembly and the frame assembly being configured such that the pedestal adapter and the frame adapter are connected to each other when the frame assembly is in the landscape orientation, the pedestal assembly and the frame assembly being configured such that the pedestal adapter and the frame adapter are connected to each other when the frame assembly is in the rotated orientation, the frame assembly being electrically connected to the pedestal assembly when the frame assembly is in the landscape orientation, the frame assembly being electrically connected to the pedestal assembly when the frame assembly is in the rotated orientation.

2. The docking station as set forth in claim 1 wherein the docking station further comprises a lock assembly moveable between a locked condition and an unlocked condition, the lock assembly being configured to lock the frame assembly to the pedestal assembly in the locked condition, the lock assembly being configured to permit detachment of the frame assembly from the pedestal assembly when the lock assembly is in the unlocked condition.

3. The docking station as set forth in claim 1 wherein the frame adapter includes a first electrical interface and the pedestal adapter includes a second electrical interface, the first electrical interface being configured to connect with the second electrical interface in a manner such that the pedestal assembly and the frame assembly are electrically connected when the pedestal adapter is connected to the frame adapter.

4. The docking station as set forth in claim 1 wherein the head portion of the pedestal assembly is configured to pivot about a horizontal axis to adjust a vertical position of the frame assembly when the pedestal adapter is connected to the frame adapter.

5. The docking station as set forth in claim 1 wherein the head portion further comprises a face, a head portion axis being generally normal to the face, the frame assembly being generally normal to the head portion axis when in the landscape orientation, the frame assembly being generally normal to the head portion axis when in the rotated orientation.

6. A docking station for a tablet device, the docking station comprising:
a frame assembly for retaining the tablet device, the frame assembly including a frame adapter, a first electrical connection and a first electrical interface, the first electrical interface being electrically connectable to the tablet device via the first electrical connection;
a pedestal assembly including a head portion and a base portion, the head portion being connected to the base portion, the head portion including a pedestal adapter, a second electrical connection and a second electrical interface, the second electrical interface being electrically connectable to a power source via the second electrical connection, the pedestal adapter being releasably connectable to the frame adapter;
the first electrical interface being electrically connected to the second electrical interface whenever the pedestal adapter is connected to the frame adapter, the first electrical interface being electrically unconnected to the second electrical interface whenever the pedestal adapter is not connected to the frame adapter;
the frame assembly being positionable relative to the base portion of the pedestal assembly in a landscape orientation and in a rotated orientation, the rotated orientation being different from the landscape orientation, the pedestal assembly and the frame assembly being configured such that the pedestal adapter and the frame adapter are connected to each other when the frame assembly is in the landscape orientation, the pedestal assembly and the frame assembly being configured such that the pedestal adapter and the frame adapter are connected to each other when the frame assembly is in the rotated orientation, the frame assembly being electrically connected to the pedestal assembly when the frame assembly is in the landscape orientation, the frame assembly being electrically connected to the pedestal assembly when the frame assembly is in the rotated orientation.

7. The docking station as set forth in claim 6 wherein the docking station further comprises a lock assembly moveable between a locked condition and an unlocked condition, the lock assembly being configured to lock the frame assembly to the pedestal assembly in the locked condition, the lock assembly being configured to permit detachment of the frame assembly from the pedestal assembly when the lock assembly is in the unlocked condition.

8. The docking station as set forth in claim 7 wherein the lock assembly comprises a sensor configured to receive a wireless signal, the lock assembly being configured to move from the locked condition to the unlocked condition upon the sensor receiving the wireless signal.

9. The docking station as set forth in claim 8 wherein the sensor is configured to receive an RFID signal.

10. The docking station as set forth in claim 6 wherein the first electrical interface is a first connector fitting and the second electrical interface is a second connector fitting.

11. The docking station as set forth in claim 10 wherein the first connector fitting is a female connector fitting and the second connector fitting is a male connector fitting.

12. The docking station as set forth in claim 6 wherein the first electrical connection includes a connector fitting, the connector fitting being connectable to the tablet device.

13. The docking station as set forth in claim 12 wherein the frame assembly further includes a stem portion, the connector fitting being electrically connected to the frame adapter via the stem portion.

14. The docking station as set forth in claim 6 wherein the first electrical interface forms a portion of the frame adapter and the second electrical interface forms a portion of the pedestal adapter.

15. The docking station as set forth in claim 6 wherein the head portion further comprises a face, a head portion axis being generally normal to the face, the frame assembly being generally normal to the head portion axis when in the landscape orientation, the frame assembly being generally normal to the head portion axis when in the rotated orientation.

16. A docking station for a tablet device, the docking station comprising:
a frame assembly for retaining the tablet device, the frame assembly including a frame adapter, a first electrical connection and a first electrical interface, the first electrical interface being electrically connectable to the tablet device via the first electrical connection;
a pedestal assembly including a head portion and a base portion, the head portion being connected to the base portion, the head portion including a pedestal adapter, a second electrical connection and a second electrical interface, the second electrical interface being electrically connectable to a power source via the second electrical connection, the pedestal adapter being releasably connectable to the frame adapter;

the first electrical interface being electrically connected to the second electrical interface whenever the pedestal adapter is connected to the frame adapter, the first electrical interface being electrically unconnected to the second electrical interface whenever the pedestal adapter is not connected to the frame adapter;

the head portion being configured such that the frame assembly is rotatable relative to the base portion of the pedestal assembly between a landscape orientation and a rotated orientation while the frame adapter is connected to the pedestal adapter, the rotated orientation being different from the landscape orientation, the pedestal assembly and the frame assembly being configured such that the pedestal adapter and the frame adapter are connected to each other when the frame assembly is in the landscape orientation, the pedestal assembly and the frame assembly being configured such that the pedestal adapter and the frame adapter are connected to each other when the frame assembly is in the rotated orientation, the first electrical interface being electrically connected to the second electrical interface when the frame assembly is in the landscape orientation, the first electrical interface being electrically connected to the second electrical interface when the frame assembly is in the rotated orientation.

17. The docking station as set forth in claim 16 wherein the docking station further comprises a lock assembly moveable between a locked condition and an unlocked condition, the lock assembly being configured to lock the frame assembly to the pedestal assembly in the locked condition, the lock assembly being configured to permit the detachment of the frame assembly from the pedestal assembly when the lock assembly is in the unlocked condition.

18. The docking station as set forth in claim 17 wherein the lock assembly comprises a sensor configured to receive a wireless signal, the lock assembly being configured to move from the locked condition to the unlocked condition upon the sensor receiving the wireless signal.

19. The docking station as set forth in claim 16 wherein the frame assembly further includes a front portion and a back portion, the front portion being connectable to the back portion, the frame assembly being configured to sandwich the tablet device between the front portion and the back portion when the front portion is connected to the back portion.

20. The docking station as set forth in claim 19 wherein the frame adapter is connected to the back portion.

21. The docking station as set forth in claim 16 wherein the head portion of the pedestal assembly further includes a protrusion, the frame adapter of the frame assembly being configured to engage the protrusion when the frame adapter is connected to the pedestal adapter.

22. The docking station as set forth in claim 16 wherein the base portion of the pedestal assembly includes a hollow portion.

23. The docking station as set forth in claim 22 wherein the second electrical connection includes a cable, the cable extending through the hollow portion.

24. The docking station as set forth in claim 16 wherein the first electrical connection includes a connector fitting, the connector fitting being connectable to the tablet device.

25. The docking station as set forth in claim 24 wherein the frame assembly further includes a stem portion, the connector fitting being electrically connected to the frame adapter via the stem portion.

26. The docking station as set forth in claim 16 wherein the first electrical interface is a first connector fitting and the second electrical interface is a second connector fitting, the second connector fitting being connectable to the first connector fitting.

27. The docking station as set forth in claim 26 wherein the first connector fitting is a female connector fitting and the second connector fitting is a male connector fitting, the male connector fitting being insertable into the female connector fitting.

28. The docking station as set forth in claim 16 wherein the rotated orientation is a portrait orientation.

29. The docking station as set forth in claim 16 wherein the head portion of the pedestal assembly is configured to pivot about a horizontal axis to adjust a vertical position of the frame assembly when the pedestal adapter is connected to the frame adapter.

30. The docking station as set forth in claim 16 wherein the frame assembly further includes a front portion connectable to a back portion, the frame assembly being configured such that the front portion and the back portion collectively surround the tablet device when the front portion is connected to the back portion, the frame adapter being connected to the back portion.

* * * * *